United States Patent
Frei et al.

(10) Patent No.: US 9,434,827 B2
(45) Date of Patent: Sep. 6, 2016

(54) POLYMER BLEND COMPRISING PROPYLENE-BASED ELASTOMER AND RANDOM COPOLYMER POLYPROPYLENE

(71) Applicant: SIKA TECHNOLOGY AG, Baar (CH)

(72) Inventors: Fabian Frei, Zürich (CH); Jean-Luc Schläpfer, Kerns (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/584,904

(22) Filed: Dec. 29, 2014

(65) Prior Publication Data

US 2015/0119515 A1    Apr. 30, 2015

Related U.S. Application Data

(63) Continuation of application No. PCT/EP2013/063056, filed on Jun. 21, 2013.

(30) Foreign Application Priority Data

Jun. 29, 2012 (EP) ..................... 12174475

(51) Int. Cl.
| | | |
|---|---|---|
| *C08J 5/18* | (2006.01) | |
| *C08L 23/16* | (2006.01) | |
| *C08K 3/22* | (2006.01) | |

(52) U.S. Cl.
CPC ........ *C08J 5/18* (2013.01); *C08L 23/16* (2013.01); *C08J 2323/14* (2013.01); *C08J 2323/16* (2013.01); *C08J 2423/14* (2013.01); *C08K 2003/2227* (2013.01); *C08L 2201/02* (2013.01); *C08L 2203/16* (2013.01); *C08L 2205/02* (2013.01); *C08L 2207/02* (2013.01); *C08L 2207/04* (2013.01)

(58) Field of Classification Search
CPC ..... C08J 5/18; C08J 2323/14; C08J 2423/14
See application file for complete search history.

(56) References Cited

U.S. PATENT DOCUMENTS

| 2006/0046084 A1* | 3/2006 | Yang et al. ............ B32B 5/022 |
| | | 428/500 |
| 2006/0269771 A1* | 11/2006 | Cogen .................... B82Y 30/00 |
| | | 428/560 |
| 2010/0197844 A1 | 8/2010 | Yang et al. |
| 2010/0255739 A1 | 10/2010 | Black et al. |
| 2011/0214395 A1 | 9/2011 | Malfait et al. |
| 2012/0232504 A1 | 9/2012 | Chang et al. |

FOREIGN PATENT DOCUMENTS

| EP | 2 186 634 A1 | 5/2010 |
| WO | WO 2011/056861 A1 | 5/2011 |

OTHER PUBLICATIONS

International Search Report (PCT/ISA/210) mailed on Jul. 24, 2013, by the European Patent Office as the International Searching Authority for International Application No. PCT/EP2013/063056.
Written Opinion (PCT/ISA/237) mailed on Jul. 24, 2013, by the European Patent Office as the International Searching Authority for International Application No. PCT/EP2013/063056.
Notification of Transmittal of Translation of the International Preliminary Report on Patentability (Forms PCT/IB/338 and PCT/IB/373) and the Written Opinion of the International Searching Authority (Form PCT/ISA/237) issued on Jan. 8, 2015, by the International Bureau of WIPO in corresponding International Application No. PCT/EP2013/063056. (7 pages).
Chinese Office Action issued in corresponding Chinese Patent Application No. 201380034922.8 dated Dec. 25, 2015.

* cited by examiner

*Primary Examiner* — Robert Harlan
(74) *Attorney, Agent, or Firm* — Buchanan Ingersoll & Rooney PC

(57) ABSTRACT

A composition including, as polymer basis: about 40 to 75% by weight of at least one polypropylene-based elastomer; and about 25 to 60% by weight of at least one random polypropylene copolymer.

25 Claims, 1 Drawing Sheet

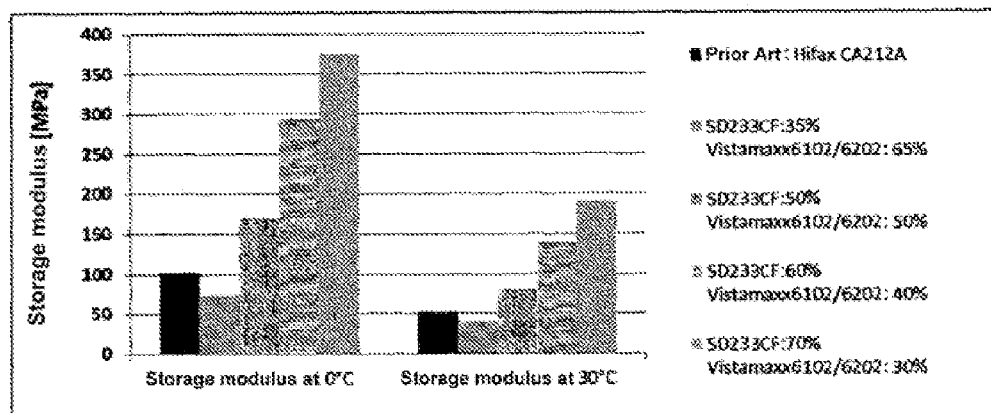

POLYMER BLEND COMPRISING PROPYLENE-BASED ELASTOMER AND RANDOM COPOLYMER POLYPROPYLENE

RELATED APPLICATION

This application claims priority as a continuation application under 35 U.S.C. §120 to PCT/EP2013/063056, which was filed as an International application on Jun. 21, 2013 designating the U.S., and which claims priority to European Application No. 12174475.9 filed in Europe on Jun. 29, 2012. The entire contents of these applications are hereby incorporated by reference in their entireties.

FIELD

The present disclosure relates to the field of polymer mixtures (polymer blends) for the production of thermoplastic olefin films, for example, thermoplastic olefin roofing membranes.

BACKGROUND INFORMATION

Thermoplastic olefin films are widely used in many fields. Particular combinations of properties can be beneficial here, depending on the application sector. By way of example, thermoplastic olefin roofing membranes can require high flexibility together with good mechanical stability at elevated temperatures and high weathering resistance. A number of proposals for thermoplastic olefin films of this type are disclosed.

US 2006/0046084 describes a thermoplastic polyolefin roofing membrane produced from a mixture of a polypropylene-based elastomer (PBE) and polyolefin copolymers.

US 2010/0255739 describes a roofing membrane with a composition comprising a propylene-based elastomer.

US 2010/0197844 describes a thermoplastic olefin membrane for use in construction materials which comprises a polypropylene-based elastomer.

However, known thermoplastic polyolefin films do not yet have a satisfactory combination of mechanical properties, for example, for use as roofing membranes.

Also disclosed are specific reactor blends, a particular example being the "Hifax" material from LyondellBasell. Although these feature good mechanical properties for use as thermoplastic polyolefin roofing membranes they have the disadvantage of being very costly.

The attempts made hitherto to provide materials which have properties of this type but are less costly have not been successful. In traditional mixtures, an at least semicrystalline polyolefin material such as polyethylene or polypropylene, which provides the mechanical strength and resistance to temperature change, is mixed with a flexible blend component. This flexible blend component is miscible, or at least compatible, with the polyolefin. Flexible blend components used in the experiments carried out hitherto are, inter alia, ethylene-propylene-diene rubber (EPDM), ethylene-n-alkene copolymers, and also polypropylene-based elastomers. However, the experiments carried out hitherto in this direction have not proven to be successful.

SUMMARY

According to an exemplary aspect, disclosed is a composition comprising, as polymer basis: about 40 to 75% by weight of at least one polypropylene-based elastomer; and about 25 to 60% by weight of at least one random polypropylene copolymer.

According to another exemplary aspect, disclosed is a thermoplastic polyolefin film produced with use of an exemplary composition.

According to another exemplary aspect, disclosed is a method for the production of thermoplastic polyolefin films, comprising: forming a thermoplastic polyolefin film from an exemplary composition.

BRIEF DESCRIPTION OF THE DRAWINGS

FIG. 1 is a graph showing the storage modulus (MPa) of various experimental roofing membranes which have identical structure but have a different polymer basis, according to exemplary aspects.

DETAILED DESCRIPTION

It is an exemplary aspect of the present disclosure to provide compositions which, on processing to give thermoplastic polyolefin films, have an advantageous combination of properties in respect of high flexibility, good mechanical stability at elevated temperatures, and high weathering resistance, while at the same time featuring a lower price in comparison with expensive reactor blends. Surprisingly, it has been found that an exemplary composition achieves this aspect. An exemplary thermoplastic polyolefin film and an exemplary method also achieve the aspects of the disclosure.

The present disclosure provides a composition comprising as polymer basis about 40 to 75% by weight of at least one polypropylene-based elastomer and about 25 to 60% by weight of at least one random polypropylene copolymer. The polymer basis refers to the polymer content of the composition.

It has been found that this type of composition has excellent suitability for producing thermoplastic olefin films, for example, thermoplastic olefin roofing membranes with an excellent combination of mechanical properties.

For the purposes of the present disclosure, the expression polypropylene-based elastomer is intended to mean a copolymer comprising propylene monomers as main component. It also comprises at least one other monomer, for example, ethylene or other alpha-olefins, for example, ethylene. It is exemplary to use block copolymers and/or graft copolymers.

The density of the polypropylene-based elastomer can be from 0.85 to 0.90 $g/cm^3$, for example, from 0.86 to 0.89 $g/cm^3$.

In an exemplary embodiment, the polypropylene-based elastomer features low crystallinity. The enthalpy of fusion can be less than 10 J/g, for example, less than 6 J/g (determined by DSC at a heating rate of 10 K/min, using a method based on DIN ISO 11357).

For the purposes of the present disclosure, the expression random polypropylene copolymer is intended to mean a copolymer which comprises propylene as main constituent and at least one other monomer, for example ethylene or other alpha-olefins, where the arrangement of these is random. It is exemplary to use ethylene as copolymer.

An exemplary advantage of an exemplary composition of the disclosure is that no special process is needed to produce and process the composition of the disclosure, because the material here involves a physical polymer blend that has good compatibility and that can be produced in any compounding equipment.

Surprisingly, it has been found that, in comparison with comparative compositions, the composition of the disclosure is advantageous in that it can be modified very flexibly to provide various formulations and filler contents, because the relative proportions of the constituents can be varied widely and many different additional substances can be added without any resultant incompatibility.

It has been found that particularly good results are achieved when the polypropylene-based elastomer has about 5% by weight or more ethylene content, for example, about 9% by weight or more, and, for example, about 11% by weight or more. As an alternative to this, or in addition to this, it is exemplary that the ethylene content of the polypropylene-based elastomer is about 20% by weight or less, for example, about 18% by weight or less, for example, about 16% by weight or less. Exemplary ethylene content ranges are about 5 to 20% by weight, for example, about 11 to 16% by weight.

An example is the use of polypropylene-based elastomers with ethylene content of from 15 to 16% by weight, the highest ethylene content obtainable commercially, because this achieves excellent flexibility. The relatively high ethylene content of compositions of this type, 15 or 16%, gives them a low flexural modulus of about 11 MPa, and they therefore contribute to the high flexibility of the compositions of the disclosure.

For example, it has proven to be advantageous to select the random polypropylene copolymer in such a way that it comprises a copolymer with about 1 to 10% by weight ethylene content, for example, about 2 to 8% by weight.

Particularly good results can be achieved when the flexural modulus of a copolymer used as random polypropylene copolymer is less than about 700 MPa, for example, less than about 650 MPa, for example, less than about 600 MPa. An exemplary flexural modulus is about 400 to 600 MPa.

With respect of the random polypropylene copolymer, it can be advantageous that the random polypropylene copolymer is a heterophasic random polypropylene copolymer with a flexural modulus of about 500 MPa. A flexural modulus of 500 MPa is comparatively low for random polypropylene copolymers obtainable commercially.

The quantitative proportions of the components used as polymer basis can be of particular importance in the context of the composition of the disclosure. It has been found that particularly good results can be achieved when the design of the composition of the disclosure is such that the composition comprises
about 45 to 70% by weight, for example, about 50 to 65% by weight, of at least one polypropylene-based elastomer and
about 30 to 55% by weight, for example, about 35 to 50% by weight, of at least one random polypropylene copolymer.

Compositions in which the mixing ratios are substantially outside these ranges (e.g., 80:20) form a sea-island structure when non-miscible phases are present, and in this structure the mechanical properties of the continuous phase predominate. This can lead to impairment of mechanical stability and of resistance to temperature change. Compliance with exemplary quantitative proportions of the teaching of the disclosure leads to formation of a cocontinuous phase, thus retaining properties of both components of the composition, i.e., flexibility on the one hand and mechanical stability on the other hand. This is highly advantageous for the properties of the composition of the disclosure.

For example, the polymer basis of the composition of the disclosure comprises no plastomer. A plastomer is an ethylene-based copolymer copolymerized with another a-olefin, for example butene or octene.

The polymer basis can comprise, alongside the at least one polypropylene-based elastomer and at least one random polypropylene copolymer described, other polymers or copolymers which do not belong to any of these categories. Examples of polymers of this type are metallocene polyethylenes and ethylene-propylene rubbers. Suitable metallocene polyethylenes are obtainable by way of example from DOW Chemical as DOW Affinity 8150, 8200, 8280, or ENR 8556. Suitable ethylene-propylene rubbers are marketed by way of example by Bayer as BUNA EP T2370P or by Exxon as Vistalon 919. In an exemplary embodiment, other polymers of this type make up at most about 10% by weight of the polymer basis, for example, at most about 5% by weight. In an exemplary embodiment, the polymer basis of the composition consists solely of at least one polypropylene-based elastomer and of at least one random polypropylene copolymer.

Both of the abovementioned embodiments have the advantage that mechanical properties are improved. Furthermore, it is thus possible to reduce the costs of production.

Because the compositions of the disclosure have high compatibility with a wide variety of additives, it is very easily possible to vary the property profile of the compositions of the disclosure via admixture of other constituents: flame retardants can be added to the compositions of the disclosure, and it is exemplary here that the composition comprises about 0 to 60% by weight of a flame retardant, for example, in the form of aluminum trihydroxide, for example, about 20 to 50% by weight, for example, about 25 to 40% by weight.

Examples of other constituents which can be added to the compositions of the disclosure are UV stabilizers, antioxidants, and/or color pigments.

In an exemplary embodiment, the design of the compositions of the disclosure is such that the composition comprises about 2 to 10% by weight of at least one UV stabilizer, for example, in the form of titanium dioxide, about 0 to 2% by weight of at least one antioxidant and/or light stabilizer, and/or about 0.5 to 2% by weight of a color pigment.

Because the composition of the disclosure has high filler tolerance it can be used as polymer basis for unfilled, and also highly filled, formulations. Highly filled formulations are used by way of example for flame-retardant roofing membranes.

The present disclosure also provides a thermoplastic polyolefin film produced with use of the composition described above.

The present disclosure also provides the use of the composition of the disclosure, as described above, for the production of thermoplastic polyolefin films, for example, in the form of thermoplastic polyolefin roofing membranes.

The thermoplastic polyolefin roofing membranes produced from the compositions of the disclosure feature an advantageous combination of mechanical properties in the form of high flexibility together with good mechanical stability at elevated temperatures, and high weathering resistance.

It has been found that mixtures of polypropylene-based elastomers and random polypropylene copolymers give very good results insofar as there is compliance with the quantitative proportions of the disclosure. There is no need here for any special precautions in respect of the process for the production of the polymer mixtures of the disclosure. The production process is of subordinate importance, insofar as adequate mixing of the blend is ensured. However, it is entirely possible, via selection of the mixture components, to achieve fine adjustment of the desired properties: the use of particularly flexible polypropylene-based elastomers with high ethylene content gives a polymer mixture with particularly low flexural modulus, and this gives particularly high flexibility of thermoplastic polyolefin films produced from the polymer mixture. It is also possible to control the properties of the polymer mixtures of the disclosure via specific selection of the random polypropylene copolymer.

The examples that now follow provide still further explanation of the teaching of the disclosure.

EXAMPLES

Example 1

Table 1 shows the mechanical properties of the compositions of the disclosure and the reactor blend Hifax Ca 212 A obtainable commercially. The flexural modulus was measured in accordance with ISO 178.

The polymer mixtures were produced on a commercially available roll mill. The temperature of the front roll was 160° C., and that of the rear roll was 150° C. The rotation rate was varied between 10 and 40 revolution/min. Good mixing of the blend components was ensured via repeated removal and return of the polymer mixture, and also via friction generated via a difference in rotational rate between front and rear roll. Total treatment time was about 10 min.

Table 1 shows the measurement results:

The first material is a blend which comprises a random polypropylene copolymer and a polypropylene-based elastomer with relatively low ethylene content. In the second material, a polypropylene homopolymer replaces the random polypropylene copolymer. The third material (Hifax Ca 212 A) represents a comparative example. The fourth material is a blend which comprises a random polypropylene copolymer and a polypropylene-based elastomer with relatively high ethylene content.

The material combination of the disclosure achieves the flexibility of the comparative example for a composition of 50% of random polypropylene copolymer and 50% of propylene-based elastomer. When the blend components are slightly shifted in favor of the polypropylene-based elastomer the flexibility of the comparative product is exceeded and, respectively, the flexural modulus value is lower than in the comparative example, and this leads to a distinct performance advantage.

TABLE 1

| | Material* | Proportion [%] | ISO 178 flexural modulus [MPa] |
|---|---|---|---|
| 1. | Borsoft SD233CF | 50 | |
| | Vistamaxx 3980 | 50 | 497 |
| 2. | Vistamaxx 6202 | 50 | |
| | PP homopolymer | 50 | 197 |
| 3. | Hifax Ca 212 A | 100 | 80 |
| 4. | Borsoft SD233CF | 50 | |
| | Vistamaxx 6202 | 50 | 85.2 |

*Borsoft SD233CF is a heterophasic random polypropylene copolymer with a flexural modulus of 500 MPa. Vistamaxx 3980 is a polypropylene-based elastomer with about 8.5% by weight ethylene content. Vistamaxx 6202 is likewise a polypropylene-based elastomer, but with about 15 to 16% by weight ethylene content.

Surprisingly, the flexibility of the fourth composition is almost the same as that of the comparative example (Hifax Ca 212 A).

Example 2

For comparative purposes, the mechanical properties of polymer compositions of the disclosure were determined and compared with the comparative example (Hifax CA 212 A). Table 2 shows the results. The values measured were determined in accordance with DIN 53504, sample of type S2, at least 3 samples in each case.

TABLE 2

| Material* | $\sigma_{MAX}$ [MPa] | $\epsilon_{BREAK}$ [%] | $\sigma_{MAX}$ (std = 1) | $\epsilon_{BREAK}$ (std = 1) |
|---|---|---|---|---|
| Hifax CA 212 A | 15.4 | 820 | 1 | 1 |
| 50% Borsoft SD233CF, 50% Vistamaxx 6102 | 23.4 | 934 | 1.52 | 1.14 |
| 50% PP7054L1, 50% Vistamaxx 6102 | 7.4 | 320 | 0.32 | 0.34 |

*PP7054L1 is a polypropylene impact copolymer. Vistamaxx 6102 is a polypropylene-based elastomer with about 15 to 16% by weight ethylene content.

As clearly shown by the values in table 2, the polymer composition of the disclosure has distinctly increased mechanical strength in comparison with Hifax CA 212 A (comparative example).

The third composition is a blend of polypropylene-based elastomer and a polypropylene impact copolymer. This exhibits a distinct reduction of mechanical strength, and this can in general terms be attributed to incompatibility of the polymers. Surprisingly, it has been found that incompatibility of this type does not arise when the composition of the disclosure is used.

Example 3

A premix was produced in a vertical universal mixer from the components that can be seen in table 3 for the lower layer for the production of a plastics web at a thickness of 1.5 mm, where the design of the upper layer differs from that of the lower layer.

TABLE 3

| Formulation for upper layer | % by weight |
|---|---|
| Borsoft SD233CF | 45 |
| Vistamaxx 6102 | 45 |
| Pigment: titanium dioxide | 5 |
| Antioxidants | 1 |
| Light stabilizer | 1 |
| Filler: chalk | 3 |

This premix was plastified in a corotating twin-screw extruder, mixed homogeneously, and extruded through a sheet extrusion die (operating width 0.3 m). Metering of material into the extruder was achieved by way of a differential weigh feeder. The temperature of the composition in the form of a web emerging from the sheet extrusion die was from 180° C. to 220° C. Output was from 10 to 15 kg per hour. This composition in the form of a web was introduced from above into the lower nip of a 3-roll polishing stack. The support material, a glass nonwoven with weight per unit area 50 g/m², was introduced simultaneously at a velocity of 0.9 m/minute from below by way of the lower roll. In order to obtain complete penetration of the support material, the polishing stack was run with a bank. The temperature of the lower roll was 120° C., and that of the middle roll was 90° C. The thickness of the web, 0.8 mm, was set by way of the gap between the lower and middle rolls. The web was then cooled by way of chill rolls to room temperature, and wound up.

TABLE 4

| Formulation for lower layer | % by weight |
|---|---|
| Borsoft SD233CF | 45 |
| Vistamaxx 6102 | 45 |
| Pigment: carbon black | 1 |
| Antioxidants | 1 |
| Light stabilizer | 1 |
| Filler: chalk | 7 |

In a second operation, the second layer with the components for the upper layer was welded inseparably to the web produced in the first operation. The methods of premixing, plastification, homogenization and extrusion were the same as that described above. The composition in the form of a web emerging from the sheet extrusion die was introduced into the lower nip of a 3-roll polishing stack. The web from the first operation was introduced simultaneously from below by way of the lower roll, and the orientation of the support material here was toward the side with the bank. The temperature of the lower roll was 90° C., and that of the middle roll was 90° C. The thickness of the web, 1.5 mm, was set by way of the gap between the lower and middle rolls. This web was then cooled by way of chill rolls to room temperature, the edges were trimmed, and the web was rolled up.

Table 5 lists the properties of the resultant web:

TABLE 5

| Test | Standard | Unit | | Value |
|---|---|---|---|---|
| Tensile strength (23° C.) | EN 12311-2 | N/mm² | longitudinal | 14.6 |
| | | | transverse | 10.6 |
| Elongation at break (23° C.) | EN 12311-2 | N/mm² | longitudinal | 714 |
| | | | transverse | 659 |
| Tensile strength (70° C.) | EN 12311-2 | N/mm² | longitudinal | 5.1 |
| | | | transverse | 3.8 |
| Elongation at break (70° C.) | EN 12311-2 | N/mm² | longitudinal | 633 |
| | | | transverse | 676 |
| Low-temperature folding endurance | EN 495-5 | ° C. | longitudinal | −40 |
| | | | transverse | −40 |
| Dimensional stability | EN 1107-2 | % | longitudinal | <0.1 |
| | | | transverse | <0.1 |
| Resistance to impact | EN 12691 | mm | type A | 1750 |

These values exhibit a distinct improvement of mechanical properties in comparison with the comparative example. The flexibility of the roofing membranes corresponds to the comparative example.

Example 4

A premix was produced in a vertical universal mixer from the components that can be seen in table 6 for the lower layer for the production of a plastics web at a thickness of 1.5 mm, where the design of the upper layer differs from that of the lower layer.

TABLE 6

| Formulation for upper layer | % by weight |
|---|---|
| Borsoft SD233CF | 35 |
| Vistamaxx 6102 | 27.5 |
| Vistamaxx 6202 | 27.5 |
| Pigment: titanium dioxide | 5 |
| Antioxidants | 1 |
| Light stabilizer | 1 |
| Filler: chalk | 3 |

This premix was plastified in a corotating twin-screw extruder, mixed homogeneously, and extruded through a sheet extrusion die (operating width 0.3 m). Metering of material into the extruder was achieved by way of a differential weigh feeder. The temperature of the composition in the form of a web emerging from the sheet extrusion die was from 180° C. to 220° C. Output was from 10 to 15 kg per hour. This composition in the form of a web was introduced from above into the lower nip of a 3-roll polishing stack. The support material, a glass nonwoven with weight per unit area 50 g/m², was introduced simultaneously at a velocity of 0.9 m/minute from below by way of the lower roll. In order to obtain complete penetration of the support material, the polishing stack was run with a bank. The temperature of the lower roll was 120° C., and that of the middle roll was 90° C. The thickness of the web, 0.8 mm, was set by way of the gap between the lower and middle rolls. The web was then cooled by way of chill rolls to room temperature, and wound up.

TABLE 7

| Formulation for lower layer | % by weight |
|---|---|
| Borsoft SD233CF | 35 |
| Vistamaxx 6102 | 27.5 |
| Vistamaxx 6202 | 27.5 |
| Pigment: carbon black | 1 |
| Antioxidants | 1 |
| Light stabilizer | 1 |
| Filler: chalk | 7 |

In a second operation, the second layer with the components for the upper layer was welded inseparably to the web produced in the first operation. The methods of premixing, plastification, homogenization and extrusion were the same as that described above. The composition in the form of a web emerging from the sheet extrusion die was introduced into the lower nip of a 3-roll polishing stack. The web from the first operation was introduced simultaneously from below by way of the lower roll, and the orientation of the support material here was toward the side with the bank. The temperature of the lower roll was 90° C., and that of the middle roll was 90° C. The thickness of the web, 1.5 mm, was set by way of the gap between the lower and middle rolls. This web was then cooled by way of chill rolls to room temperature, the edges were trimmed, and the web was rolled up.

The resultant web had the properties listed in table 8.

TABLE 8

| Test | Standard | Unit | | Value |
|---|---|---|---|---|
| Tensile strength (23° C.) | EN 12311-2 | N/mm² | longitudinal | 12.3 |
| | | | transverse | 11.2 |
| Elongation at break (23° C.) | EN 12311-2 | N/mm² | longitudinal | 758 |
| | | | transverse | 801 |
| Tensile strength (70° C.) | EN 12311-2 | N/mm² | longitudinal | 3.3 |
| | | | transverse | 2.2 |
| Elongation at break (70° C.) | EN 12311-2 | N/mm² | longitudinal | 686 |
| | | | transverse | 709 |
| Low-temperature folding endurance | EN 495-5 | ° C. | longitudinal | −40 |
| | | | transverse | −40 |
| Dimensional stability | EN 1107-2 | % | longitudinal | <0.1 |
| | | | transverse | <0.1 |
| Resistance to impact | EN 12691 | mm | type A | 1750 |

In comparison with example 3, the mechanical strength values achieved by a roofing membrane of example 4 are slightly lower, but still within the range of the comparative example. The advantage of the roofing membrane of the disclosure as in example 4 is the distinctly increased flexibility, which provides considerable advantages of the application.

The flexibility was determined in the DIN EN ISO 6721-1 torsion pendulum test, using a "Myrenne ATM3" torsion pendulum and the following parameters:

Heating rate 1 K/min, frequency 1 Hz, deflection angle about 1°, test length 50 mm, test width 10 mm, dimensions of sample 60×10 mm.

FIG. 1 shows the storage modulus G' [MPa] of various experimental roofing membranes which have identical structure but have a different polymer basis. The ratio of polypropylene-based elastomer to random polypropylene copolymer was different in each case. It is clear that a ratio of 65% of PP-based elastomer (Vistamaxx) to, correspondingly 35% of random PP copolymer (SD233CF) achieves a blend with more flexibility than a comparative example. When the "50% of PP-based elastomer (Vistamaxx) and 50% of random polypropylene copolymer (SD233CF)" embodiment is compared with the comparative roofing membrane, it has distinctly higher mechanical strength with approximately the same flexibility.

It will be appreciated by those skilled in the art that the present invention can be embodied in other specific forms without departing from the spirit thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A composition comprising, as polymer basis:
   about 40 to 75% by weight of at least one polypropylene-based elastomer; and
   about 25 to 60% by weight of at least one random polypropylene copolymer,
   wherein the at least one random polypropylene copolymer is a copolymer with a flexural modulus of less than about 650 MPa.

2. The composition as claimed in claim 1, wherein the at least one polypropylene-based elastomer comprises about 5 to 20% by weight ethylene content.

3. The composition as claimed in claim 1, wherein the at least one polypropylene-based elastomer comprises a copolymer which comprises propylene monomers as main component and at least one other monomer.

4. The composition as claimed in claim 1, wherein the density of the at least one polypropylene-based elastomer is from 0.85 to 0.90 g/cm$^3$.

5. The composition as claimed in claim 1, wherein the enthalpy of fusion of the at least one polypropylene-based elastomer is less than 10 J/g.

6. The composition as claimed in claim 1, wherein the at least one random polypropylene copolymer is a copolymer with a flexural modulus of about 400 to 600 MPa.

7. The composition as claimed in claim 1, wherein the at least one random polypropylene copolymer is a heterophasic random polypropylene copolymer.

8. The composition as claimed in claim 1, wherein the composition comprises:
   about 45 to 70% by weight of the at least one polypropylene-based elastomer and
   about 30 to 55% by weight of the at least one random polypropylene copolymer.

9. The composition as claimed in claim 1, wherein the polymer basis of the composition comprises no plastomer.

10. The composition as claimed in claim 1, wherein the polymer basis of the composition consists of the at least one polypropylene-based elastomer and the at least one random polypropylene copolymer.

11. The composition as claimed in claim 1, wherein the composition comprises a flame retardant.

12. The composition as claimed in claim 1, wherein the composition comprises about 20 to 60% by weight of a flame retardant.

13. A thermoplastic polyolefin film produced from the composition as claimed in claim 1.

14. A method for the production of a thermoplastic polyolefin film, the method comprising:
    forming a thermoplastic polyolefin film from the composition as claimed in claim 1.

15. The composition as claimed in claim 1, wherein the at least one polypropylene-based elastomer comprises about 11 to 16% by weight ethylene content.

16. The composition as claimed in claim 1, wherein the density of the at least one polypropylene-based elastomer is from 0.86 to 0.89 g/cm$^3$.

17. The composition as claimed in claim 1, wherein the enthalpy of fusion of the at least one polypropylene-based elastomer is less than 6 J/g.

18. The composition as claimed in claim 1, wherein the at least one random polypropylene copolymer is a copolymer with a flexural modulus of less than about 600 MPa.

19. The composition as claimed in claim 1, wherein the at least one random polypropylene copolymer is a heterophasic random polypropylene copolymer with a flexural modulus of about 500 MPa.

20. The composition as claimed in claim 1, wherein the composition comprises:
    about 50 to 65% by weight of the at least one polypropylene-based elastomer and
    about 35 to 50% by weight of the at least one random polypropylene copolymer.

21. The composition as claimed in claim 12, wherein the flame retardant is aluminum trihydroxide.

22. The composition as claimed in claim 1, wherein the composition comprises about 20 to 50% by weight of aluminum trihydroxide.

23. The composition as claimed in claim 1, wherein the composition comprises about 25 to 40% by weight of aluminum trihydroxide.

24. The method for the production of a thermoplastic polyolefin films as claimed in claim 14, wherein the thermoplastic polyolefin film is a roofing membrane.

25. The composition as claimed in claim 1, wherein the polypropylene-based elastomer has an ethylene content of about 9% by weight or more.

* * * * *